Patented May 3, 1938

2,116,472

UNITED STATES PATENT OFFICE 2,116,472

PROCESS OF REACTING NITRILES WITH PHOSPHORUS PENTASULPHIDE

Anderson W. Ralston, Chicago, Ill., assignor to Armour and Company, Chicago, Ill., a corporation of Illinois No Drawing. Application December 31, 1936, Serial No. 118,694

12 Claims. (Cl. 260—17)

This invention relates to processes of treating aliphatic nitriles with phosphorus pentasulphide to obtain oily materials which are non-corrosive for metals and which can be used as lubricants, especially in extreme pressure lubrication.

Relatively high molecular weight aliphatic nitriles, such as those nitriles containing 10 or more carbon atoms in the nitrile molecule, are materials of increasing technical importance. They can be prepared readily from higher fatty acids such as lauric, myristic, palmitic and stearic, and also from unsaturated higher fatty acids such as oleic, linoleic and linolenic. These nitriles are advantageously prepared by reacting a higher fatty acid with ammonia as described in the Ralston U. S. Patent 2,061,314. For example, stearic acid when reacted with ammonia in accordance with said patent can be made to yield heptadecyl nitrile and palmitic acid will yield pentadecyl nitrile.

I have now discovered that such nitriles can be made to react with phosphorus pentasulphide to give oily materials of unknown constitution containing both phosphorus and sulphur. These products can be used as lubricants for machinery, the bearings of which operate under high pressures. Such lubricants, for this special purpose, are known as extreme pressure lubricants and practically no hydrocarbon lubricant will behave as a satisfactory extreme pressure lubricant unless certain auxiliary materials have been added to it. The products of the present invention meet the requirements of this art. When used for this purpose, the machine parts are lubricated with the material per se, and not dissolved in a hydrocarbon lubricating oil because they are not soluble in such oils.

As starting materials for the preparation of my reaction products I can begin with any saturated or unsaturated aliphatic nitrile, RCN, having 9 or more carbon atoms in the alkyl group, or a total of 10 or more carbon atoms in the entire molecule. Ordinarily I prefer to use those nitriles derived from stearic, oleic, linoleic or linolenic acids because such fatty acids are readily available at but little expense. One of the best ultimate starting materials for the preparation of my reaction products is soy bean fatty acids. These fatty acids can be prepared from soy bean oil in ways well known, and the mixture of fatty acids contains oleic, linoleic and linolenic acids. Consequently, I shall describe my invention more particularly with reference to nitriles made from such fatty acids, it being understood, however, that other higher fatty acids such as stearic, palmitic, and the like will also yield nitriles for use in my process.

In broad aspects, my invention comprises reacting phosphorus pentasulphide with such aliphatic nitriles at a moderately elevated temperature. For example, I admix 400 parts by weight of the nitriles obtained from soy bean fatty acids and ammonia with 80 parts by weight of phosphorus pentasulphide. This mixture is heated at a temperature of about 100° C. for about 24 hours. At the conclusion of the heating period steam is advantageously passed into the reaction mixture to drive out any volatile substances, but there is very little distillation. Finally, the reaction product is washed with hot water until neutral and allowed to dry. The reaction product is a rather viscous oily material containing both phosphorus and sulphur. It does not dissolve in petroleum hydrocarbon lubricants, it is non-corrosive for metals, and when used as a lubricant it functions satisfactorily at high bearing pressures.

The amount of phosphorus pentasulphide added does not appear to be critical, but when using saturated higher fatty acid nitriles such as heptadecyl nitrile I find that somewhat less phosphorus pentasulphide will suffice. I do not ordinarily use less than about one part of phosphorus pentasulphide for each 10 parts of higher fatty acid nitrile regardless of the kind of nitrile present. When using the unsaturated higher fatty acid nitriles it is better to double this quantity of phosphorus pentasulphide and that is why I have used a ratio of about 5 parts of soy bean fatty acid nitriles to one part of phosphorus pentasulphide.

Using the above proportions all of the pentasulphide dissolves and reacts with the nitrile. If an excess be present over and above that which will react, the excess can be removed by filtration, or it can be removed by the action of steam as described above. The steam will react with the excess phosphorus pentasulphide to form water soluble reaction products which are removed during the subsequent washing of the reaction product with hot water.

My products contain both phosphorus and sulphur in addition to nitrogen carbon and hydrogen. The exact nature of the reaction is not understood and it is probably very complex. It is significant, however, that steam and hot water do not decompose the final reaction product and, consequently, I believe that both phosphorus and sulphur are strongly linked in the nitrile molecule.

The temperature stated above can vary, but

I prefer to avoid temperatures in excess of about 150° C. since such temperatures may result in the formation of rather viscous and gummy polymeric substances. Although the reaction will proceed at temperatures as low as 50° or 60° C. I find it better to operate at temperatures approximately 100° C. in order to insure that the reaction will be completed within a reasonable length of time.

Having thus described my invention, what I claim is:

1. The process which comprises reacting an aliphatic nitrile containing at least 10 carbon atoms with phosphorus pentasulphide at a temperature of about 50° C. to about 150° C.

2. The process which comprises reacting an unsaturated fatty acid nitrile having at least 10 carbon atoms with phophorus pentasulphide at a temperature of about 50° C. to about 150° C.

3. The process which comprises reacting a mixture of unsaturated higher fatty acid nitriles with phosphorus pentasulphide at a temperature of about 50° C. to about 150° C.

4. The process which comprises reacting soy bean fatty acid nitriles with phophorus petasulphide at a temperature of about 50° C. to about 150° C.

5. The process as in claim 1 wherein the temperature is about 100° C.

6. The process as in claim 2 wherein the temperature is about 100° C.

7. The process as in claim 3 wherein the temperature is about 100° C.

8. The process as in claim 4 wherein the temperature is about 100° C.

9. The product of reacting a higher fatty acid nitrile containing at least 10 carbon atoms with phosphorus pentasulphide at a temperature of about 50° C. to about 150° C.

10. The product of reacting an unsaturated higher fatty acid nitrile having at least 10 carbon atoms with phosphorus pentasulphide at a temperature of about 50° C. to about 150° C.

11. The product of reacting a mixture of unsaturated higher fatty acid nitriles with phosphorus pentasulphide at a temperature of about 50° C. to about 150° C.

12. The product of reacting a soy bean fatty acid nitrile with phophorus pentasulphide at a temperature of about 50° C. to about 150° C.

ANDERSON W. RALSTON.